Dec. 30, 1924.
C. P. CASS
1,520,698
MOTOR VEHICLE BRAKE
Filed March 24, 1924
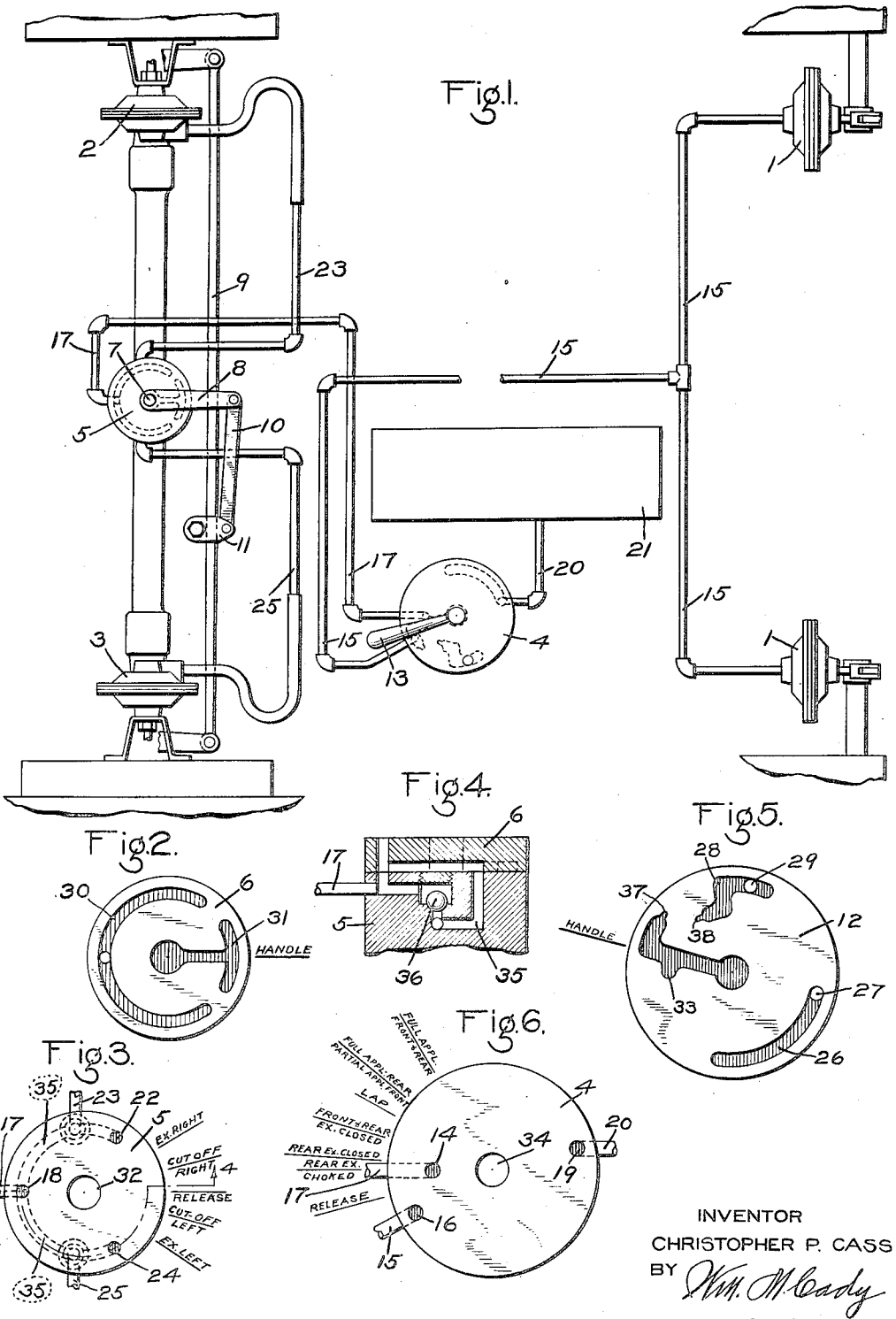
INVENTOR
CHRISTOPHER P. CASS
BY *Wm. M. Cady*
ATTORNEY Patented Dec. 30, 1924.

1,520,698

UNITED STATES PATENT OFFICE.

CHRISTOPHER P. CASS, OF BERKELEY, CALIFORNIA, ASSIGNOR TO THE WESTING-HOUSE AIR BRAKE COMPANY, OF WILMERDING, PENNSYLVANIA, A CORPORATION OF PENNSYLVANIA.

MOTOR-VEHICLE BRAKE.

Application filed March 24, 1924. Serial No. 701,303.

*To all whom it may concern:*

Be it known that I, CHRISTOPHER P. CASS, a citizen of the United States, residing at Berkeley, in the county of Alameda and State of California, have invented new and useful Improvements in Motor-Vehicle Brakes, of which the following is a specification.

This invention relates to motor vehicle brakes, and more particularly to that type in which the brakes are applied to all four wheels of the vehicle.

Where a motor vehicle is equipped with brakes on all four wheels, it is desirable to reduce the braking power on the front whels in rounding curves, particularly on the wheel taking the outside of the curve, in order to avoid interference with steering.

One object of my invention is to provide a fluid pressure four wheel brake apparatus having means for automatically releasing the brake on the front wheel taking the outside of the curve in rounding a curve.

Another object of my invention is to provide a fluid pressure four wheel brake apparatus having means for either applying the brakes on all four wheels with the same pressure or applying the brakes on the front wheels with a less pressure than on the rear wheels.

Another object of my invention is to provide a fluid pressure four wheel brake apparatus in which the brakes may either be released simultaneously at the same rate on all four wheels or the release of the brakes on the rear wheels may be choked or delayed while the brakes on the front wheels are quickly released.

Other objects and advantages will appear in the following more detailed description of the invention.

In the accompanying drawing; Fig. 1 is a diagrammatic plan view of a fluid pressure brake apparatus for controlling the brakes on all four wheels of a motor vehicle and embodying my invention; Fig. 2 a face view of the rotary valve of the front wheel selector valve device; Fig. 3 a plan view of the valve seat for said rotary valve; Fig. 4 a section on the line 4—4 of Fig. 3; Fig. 5 a face view of the rotary valve of the brake valve device; and Fig. 6 a plan view of the valve seat for said valve.

As shown in Fig. 1 of the drawings, brake chambers 1 may be provided for controlling the brakes at each rear wheel of the motor vehicle and brake chambers 2 and 3 are provided for controlling the brakes at each of the corresponding front wheels.

A brake valve device 4 is provided for controlling the admission and release of fluid under pressure to and from the brake chambers, and a selector valve device 5 is employed to automatically control the supply and exhaust of fluid to and from each of the front wheel brake chambers 2 and 3.

The selector valve device 5 may comprise a casing containing a rotary valve 6 having a stem 7 which is connected to an operating arm 8. The arm 8 is operatively connected to the usual steering cross rod 9 through a link 10 which is pivotally connected at one end to a bracket 11 secured to the rod 9 and at the other end to the arm 8.

The brake valve device 4 may comprise a casing containing a rotary valve 12 adapted to be operated by a handle 13.

A port 16 in the seat of the rotary valve 12 is connected through pipe 15 to the rear wheel brake chambers 1, port 14 is connected through pipe 17 to a port 18 in the seat of the rotary valve 6, and port 19 is connected through pipe 20 to a reservoir 21 adapted to be charged with fluid under pressure.

A port 22 in the seat of rotary valve 6 is connected through pipe 23 with the brake chamber 2 and port 24 is connected through pipe 25 with the brake chamber 3.

When the front wheels of the vehicle are set for straight driving, as shown in Fig. 1, the arm 8 is so positioned by its connection with the rod 9 that a cavity 30 in the rotary valve 6 connects the ports 22 and 24 with the port 18, so that fluid pressure supplied from the brake valve device 4 through pipe 17 will be admitted to both brake chambers 2 and 3.

If, while the car is running straight ahead or substantially so, it is desired to apply the brakes, the brake valve handle 13 may be turned to the position marked "Full application, front and rear". In this position, a cavity 26 in the rotary valve 12 registers with supply port 19, and fluid under pressure is then supplied through port 27, extending through the rotary valve, to the rotary valve chamber of the brake valve device. In this position, a cavity 28 in rotary valve 12 registers fully with both ports 14 and 16, so that fluid under pressure is supplied from the rotary valve chamber through port 29 and cavity 28 to pipes 15 and 17. Fluid supplied to pipe 15 flows to both the rear wheel brake chambers 1 and fluid supplied to pipe 17 flows through cavity 30 in the rotary valve 6 of the front wheel selector valve device to pipes 23 and 25, so that fluid under pressure is supplied to the front wheel brake chambers 2 and 3 to apply the brakes. It will thus be seen that in this position, fluid under pressure is supplied equally and at the same rate to all four brake chambers.

If the car happens to be rounding a curve when the brakes are applied or if the brakes are applied when the curve is reached, the turning of the front wheels, if the curve is sufficiently sharp, will cause communication to be cut off from one or the other of ports 22 and 24 to the cavity 30, according to the direction in which the vehicle is turned. If the vehicle turns toward the right, then the valve 6 will be moved so as to cut off communication to the port 24 leading to the left brake chamber 3 and if the wheels are turned sufficiently, port 24 will register with an exhaust cavity 31 in the valve 6, which is in constant communication with a central exhaust port 32 in the valve seat. The fluid pressure in the brake chamber 3 will thus be exhausted, so as to release the brakes at the left front wheel. When turning to the right, the left hand wheel of course takes the outside of the curve, so that the brake on the wheel taking the outside curve will be automatically released.

If the vehicle turns toward the left in rounding a curve, the same action takes place, the port 22 leading to the right wheel brake chamber 2, being in this case connected to the exhaust cavity 31, so that the brake is automatically released at the right front wheel, or the wheel which is now taking the outside of the curve.

If the brakes are applied while the front wheels are turned, fluid will only be supplied to the front wheel brake chamber of the wheel taking the outside of the curve and if the brakes were previously applied for taking the curve, the brake will be released at the front wheel taking the outside curve.

It will also be noted that if the brakes are applied in rounding a curve, while the brake of the front wheel taking the outside of the curve will be released during the time the car is rounding the curve, if the car again proceeds straight ahead, or sufficiently so, the cavity 30 will again connect with both ports 22 and 24, so that the brakes are automatically reapplied at such wheel and all four brake chambers being connected together, the fluid pressures in all the brake chambers would equalize.

In order to effect a uniform release of the brakes at all four wheels, the brake valve handle 13 may be turned to the position marked "Release" in Fig. 6. In this position, an exhaust cavity 33, which constantly connects with a central exhaust port 34 in the valve seat, fully registers with ports 14 and 16, so that fluid is exhausted from all four brake chambers, if the vehicle is running straight ahead.

If the brakes are applied on a straight track and a curve should be rounded of sufficient curvature to effect the movement of the valve 6 so as to lap one of the ports 22 or 24 then the brake could not be released at the wheel taking the outside of the curve and in order to provide means for ensuring the release of both front wheel brakes, regardless of the position of the rotary valve 6, I provide a by-pass passage 35 in the body of the selector valve device, one at each side, which passage connects the corresponding port 22 or 24 with pipe 17. A non-return ball check valve 36 is interposed in said by-pass passage, so as to prevent the supply of fluid from pipe 17 to the corresponding brake chamber port, but adapted to permit the release of fluid under pressure from the brake chamber connected to the corresponding port, when fluid is released through pipe 17 by operation of the brake valve device 4.

A full application of the brakes at the rear wheels and a partial application at the front wheels may be made by turning the brake valve handle to the position marked "Full application rear, partial application front," as indicated in Fig. 6. In this position, the rear wheel brake port 16 fully registers with cavity 28 in the rotary valve 12, so that fluid is supplied to the rear brake chambers at the full rate, but only a restricted extension 37 of said cavity connects with the front brake port 14, so that the flow of fluid to the front wheel brake chambers is restricted.

The exhaust of fluid from the rear wheel brake chambers may be restricted, while a full exhaust from the front wheel brake chambers is effected, by turning the brake valve handle to the position marked "Rear exhaust choked" in Fig. 6. In this position, the front brake port 14 is fully open to the exhaust cavity 33, while the rear brake port 16 is connected to said cavity through a restricted extension 38.

In the position marked "Rear exhaust closed," fluid will be released from the front brake chambers, since port 14 registers with cavity 33, while the exhaust from the rear brake chambers is cut off, since port 16, in this position, does not register with the exhaust cavity 33.

By means of the above described construction, it will be seen that, if desired, a slower application of the brakes at the front wheels than at the rear wheels may be obtained and that the release of the front wheel brakes may be made in advance of the release of the rear wheel brakes.

In rounding curves, the brake of the wheel at the outside of the curve is automatically released, if applied, while the brake of this wheel is not applied, if an application of the brakes is made while rounding a curve. When the car is running straight ahead, the brakes will be applied equally at all four wheels of the vehicle.

Having now described my invention, what I claim as new and desire to secure by Letters Patent, is:—

1. In a vehicle brake, the combination with means for applying the brakes by fluid pressure at each front wheel of the vehicle, of means controlled by the turning of the front wheels for preventing an application of the brakes at one of the front wheels.

2. In a vehicle brake, the combination with means for applying the brakes by fluid pressure at each front wheel of the vehicle, of means controlled by the turning of the front wheels for controlling communication through which fluid under pressure is supplied to apply the brakes.

3. In a vehicle brake, the combination with means for applying the brakes by fluid under pressure at each front wheel of the vehicle, of means operated upon turning the front wheels to a predetermined extent for closing communication through which fluid under pressure is supplied to apply the brakes at one of the front whels.

4. In a vehicle brake, the combination with means for applying the brakes by fluid under pressure at each front wheel of the vehicle, of means operated upon turning the front wheels to a predetermined extent for releasing the fluid pressure brake at one of the front wheels.

5. In a vehicle brake, the combination with means for applying the brakes by fluid under pressure at each front wheel of the vehicle, of means operated upon turning the front wheels to a predetermined extent for releasing the fluid pressure brake at the front wheel taking the outside of the curve.

6. In a vehicle brake, the combination with means for applying the brakes by fluid under pressure at each front wheel of the vehicle, of means operated upon turning a curve for automatically releasing the fluid pressure brake at the front wheel taking the outside of the curve.

7. In a vehicle brake, the combination with means for applying the brakes by fluid under pressure at each front wheel of the vehicle, of means operated upon turning the front wheels to a predetermined extent for cutting off communication through which fluid is supplied to apply the brakes at one of the front wheels and upon turning the front wheels to a further extent for releasing the brake at said front wheel.

8. In a vehicle brake, the combination with means for applying the brakes by fluid under pressure at each front wheel of the vehicle, of means for automatically releasing the fluid pressure brake at the front wheel taking the outside of the curve upon turning a curve.

9. In a vehicle brake, the combination with means for applying the brakes by fluid under pressure at all four wheels of the vehicle, of means operated upon turning a curve for preventing an application of the brakes at one of the front wheels while the brakes are applied at the other three wheels of the vehicle.

10. In a vehicle brake, the combination with means for applying the brakes by fluid under pressure at all four wheels of the vehicle, of means operated upon turning a curve for releasing the brake at one of the front wheels while the brakes remain applied on the other three wheels of the vehicle.

11. In a vehicle brake, the combination with means for applying the brakes by fluid under pressure at all four wheels of the vehicle, of means operated upon turning a curve for releasing the brake at one of the front wheels of the vehicle and for reapplying the brake at said front wheel when a straight road is resumed.

12. In a vehicle brake, the combination with a valve device for controlling the supply of fluid under pressure for applying the brakes at each of the front wheels of the vehicle, of a valve operated by the turning of the front wheels for controlling communication through which fluid under pressure is supplied by said valve device.

13. In a vehicle brake, the combination with a valve device for controlling the supply of fluid under pressure for applying the brakes at each of the front wheels of the vehicle, of a valve movable with the front wheels in steering and having one position in which communication is established for applying fluid from said valve device to apply the brakes at both front wheels and other positions, in which communication for supplying fluid to apply the brakes at one front wheel is maintained while communication for supplying fluid to apply the brakes at the other front wheel is cut off.

14. In a vehicle brake, the combination with a valve device for controlling the supply of fluid under pressure for applying the brakes at each of the front wheels of the vehicle, of a valve movable with the front wheels in steering and having one position in which communication is established for supplying fluid from said valve device to apply the brakes at both front wheels and other positions, in which communication for supplying fluid to apply the brakes at one front wheel is maintained while communication is established for releasing fluid under pressure from the brake at the other front wheel.

15. In a vehicle brake, the combination with a valve device for controlling the supply of fluid under pressure for applying the brakes at each of the front wheels of the vehicle, of a steering rod connecting the front wheels of the vehicle and a valve operatively connected to said rod for controling communication through which said valve device supplies fluid under pressure to apply the brakes.

16. In a vehicle brake, the combination with a valve device for controlling the supply of fluid under pressure for applying the brakes at each of the front wheels of the vehicle, of a steering rod connecting the front wheels of the vehicle and a valve operatively connected to said rod and operable by said rod when the front wheels are turned for cutting off communication through which fluid is supplied by said valve device to apply the brakes at one of the front wheels.

17. In a vehicle brake, the combination with a valve device for controlling the supply of fluid under pressure for applying the brakes at each of the front wheels of the vehicle, of a steering rod connecting the front wheels of the vehicle and a valve operatively connected to said rod and operable by said rod when the front wheels are turned for releasing the brake at one of the front wheels.

18. In a vehicle brake, the combination with means for applying the brakes at each of the front wheels of the vehicle, of valve means operated upon turning the front wheels for cutting off communication through which fluid is supplied to apply the brakes of one of the front wheels and means for releasing the brakes at said front wheel regardless of the position of said valve means.

19. In a vehicle brake, the combination with means for simultaneously applying the brakes by fluid under pressure at all four wheels of the vehicle, of means for applying the brakes at the front wheels at a slower rate than the brakes at the rear wheels.

20. In a vehicle brake, the combination with means for simultaneously applying the brakes by fluid under pressure at all four wheels of the vehicle, of means for releasing the brakes at the front wheels in advance of the release of the brakes at the rear wheels.

21. In a vehicle brake, the combination with means for simultaneously applying the brakes by fluid under pressure at all four wheels of the vehicle, of means for applying the brakes at the front wheels at a slower rate than the brakes at the rear wheels and for releasing the brakes at the front wheels in advance of the release of the brakes at the rear wheels.

22. In a vehicle brake, the combination with a brake valve device for controlling the admission and release of fluid under pressure for applying and releasing the brakes on all four wheels of the vehicle, of means in the brake valve device for effecting the application of the brakes at the rear wheels in advance of the application of the brakes at the front wheels.

23. In a vehicle brake, the combination with a brake valve device for controlling the admission and release of fluid under pressure for applying and releasing the brakes on all four wheels of the vehicle, of means in the brake valve device for effecting the release of the brakes at the front wheels in advance of the release of the brakes at the rear wheels.

24. In a vehicle brake, the combination with a brake valve device for controlling the admission and release of fluid under pressure for applying and releasing the brakes on all four wheels of the vehicle, of means in the brake valve device for effecting the application of the brakes at the rear wheels in advance of the application of the brakes at the front wheels and the release of the brakes at the front wheels in advance of the release of the brakes at the rear wheels.

In testimony whereof I have hereunto set my hand.

CHRISTOPHER P. CASS.